(12) United States Patent
Sherman et al.

(10) Patent No.: US 6,213,005 B1
(45) Date of Patent: Apr. 10, 2001

(54) REINFORCED COOKING PAN

(76) Inventors: Aleksandr Sherman, 4038 Surf Ave., Brooklyn, NY (US) 11224; Beril Lax, 11 Independence Dr., Aberdeen, NJ (US) 07747

( * ) Notice: Subject to any disclaimer, the term of this patent is extended or adjusted under 35 U.S.C. 154(b) by 0 days.

(21) Appl. No.: 09/454,641

(22) Filed: Dec. 6, 1999

(51) Int. Cl.[7] ............... A47J 37/04; B65D 1/34; B65D 90/00
(52) U.S. Cl. ............... 99/426; 99/444; 99/449; 220/573.1; 220/743; 220/756
(58) Field of Search ............. 99/426, 444, 449; 220/573.1, 743, 756, 315, 912

(56) References Cited

U.S. PATENT DOCUMENTS

| | | | | |
|---|---|---|---|---|
| 4,186,217 | * | 1/1980 | Tchack | 99/444 X |
| 4,852,760 | * | 8/1989 | Sarnoff et al. | 220/573.1 X |
| 5,029,721 | * | 7/1991 | Timpe | 220/573.1 X |
| 5,503,062 | * | 4/1996 | Buff, IV | 99/426 |
| 6,065,629 | * | 5/2000 | Sarnoff et al. | 220/743 X |

* cited by examiner

*Primary Examiner*—Reginald L. Alexander
(74) *Attorney, Agent, or Firm*—Kirschstein, et al.

(57) ABSTRACT

A reinforced cooking pan includes a network of channels bounded by wall portions of a metallic foil pan, and an integrated framework of reinforcing elements fixedly mounted in the channels to reinforce the wall portions.

12 Claims, 2 Drawing Sheets

REINFORCED COOKING PAN

BACKGROUND OF THE INVENTION

1. Field of the Invention

The present invention generally relates to foil pans for roasting and oven baking of large foods, such as turkeys, hams, roasts and the like and, more particularly, to reinforcing such pans to resist buckling and twisting during the handling of the pans.

2. Description of the Related Art

Disposable aluminum foil pans for supporting large and heavy food items, such as turkeys, hams, roasts and the like, are widely used for cooking in ovens, and for transporting the food items to and from the ovens. To ensure quick distribution of heat and to make the pans so inexpensive that it is economically feasible to dispose of the pans after use, the pans are typically stamped from aluminum sheet material having a thickness on the order of 6.5 mils or less. This thickness is generally suitable for supporting food items of no more than twenty pounds.

As advantageous as these known pans are, the prior art pans tended to buckle and twist, especially when the sheet material thickness was reduced below 6.5 mils, and when the food items weighed more than twenty pounds, during transport of the pans to and from an oven. If there were liquids in the pans, such as gravy or cooking juices, care had to be exercised to prevent the liquids from spilling over the sides of the pans, or from leaking through cracks or splits in the pans caused by the buckled and twisted pans.

The art has attempted to solve the buckling and twisting problems in various ways. For example, crease lines were stamped in the base and side walls of some prior art pans to provide a measure of reinforcement. It was also known, for example, from U.S. Pat. No. 4,429,625, to roll, crimp or curl over the peripheral rims of some prior art pans to rigidify and add strength to the pans. However, the reliance upon the material of the pan itself often failed to prevent the buckling and twisting problems.

Other known techniques exemplified, for example, by U.S. Pat. Nos. 5,203,254 and No. 5,503,062 involve the use of outer support racks and/or inner support racks. These racks either directly support the food items above the base walls, or support the pans from below the base walls. Such racks are designed to be detachably mounted on the pans and, in use, frequently become dislodged from the pans, thereby defeating the reinforcement function at the very time it is most needed.

SUMMARY OF THE INVENTION

Objects of the Invention

Accordingly, it is a general object of this invention to reinforce a cooking pan by integrating a framework with the pan.

More particularly, it is an object of the present invention to provide a reinforced pan capable of supporting heavy food items in excess of twenty pounds.

Still another object of the present invention is to provide a disposable cooking pan of durable construction and capable of transporting food items to and from an oven without buckling or twisting during transport.

Features of the Invention

In keeping with the above objects and others which will become apparent hereafter, one feature of the present invention resides, briefly stated, in a reinforced pan for supporting a food to be cooked. The pan includes a base wall constituted of a metallic foil and having a periphery, a side wall constituted of a metallic foil and extending in a generally upward direction from the periphery of the base wall, and a rim wall constituted of a metallic foil and extending along a generally outward direction from the side wall. The rim wall also extends along a peripheral course around the side wall.

In accordance with this invention, a channel network has at least one channel bounded by wall portions of at least one of the walls, and a rigid framework is integrated in the channel network. The framework has at least one reinforcing element fixedly mounted in and along said at least one channel to reinforce said at least one of the walls.

In the preferred embodiment, the rim wall has rim wall portions extending along the peripheral course, and the channel network has a rim channel bounded by the rim wall portions. The framework includes a rim element mounted in the rim channel to reinforce the rim. The framework also includes a pair of handles extending generally along the upward direction above the rim wall. The handles are connected to the rim element.

Preferably, the base wall has base wall portions, and the side wall has side wall portions. The channel network has a pair of base channels bounded by the base wall portions, and two pairs of side channels bounded by the side wall portions. Each of the base channels is aligned with, and extends between, a respective pair of the side channels. The framework includes a pair of pan elements, each of the pan elements being mounted in and along a respective one of the base channels and the respective aligned pair of the side channels. The base wall extends along a longitudinal direction, and the base channels extend in mutual parallelism along the longitudinal direction.

Another feature of the preferred embodiment resides in providing the base wall with additional base portions, and the side wall with additional side wall portions. The channel network has an additional base channel bounded by the additional base wall portions, and a pair of additional side channels bounded by the additional side wall portions. The additional base channel is aligned with, and extends between, the pair of additional side channels. The framework includes an additional pan element mounted in and along the additional base channel and the aligned pair of the additional side channels. The additional base channel extends along a transverse direction generally perpendicular to the longitudinal direction.

The framework is constituted of a one-piece metallic structure, such as steel wire. The pan walls have exterior surfaces facing away from the food to be cooked. The channel network includes a plurality of the channels, each of the channels being open at the exterior surfaces of the walls. Each channel has a generally U-shaped configuration.

The methods of making and reinforcing the pan are also within the scope of this invention as detailed below.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
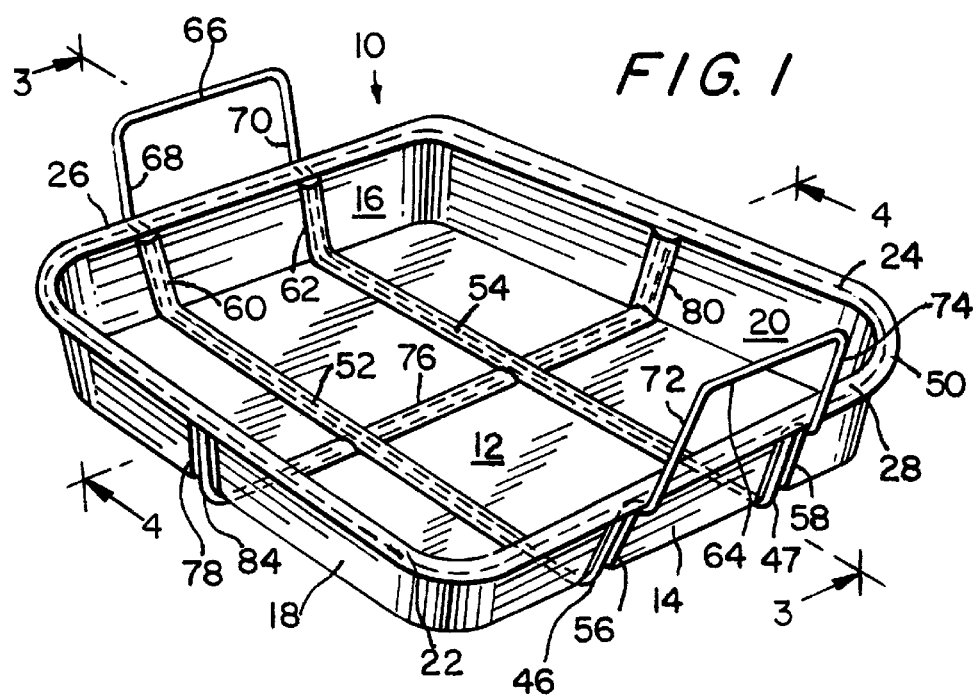
FIG. 1 is a perspective view of a reinforced cooking pan in accordance with this invention.

Referring now to the drawings, reference numeral 10 in FIG. 1 generally identifies a reinforced pan for supporting a food to be cooked. Food, such as turkeys, hams, roasts and the like, which is relatively heavy, may be cooked and roasted, as well as transported before and after the cooking and roasting, in the reinforced pan without excessive buckling, twisting and like deformation, as described herein.

The reinforced pan 10 includes a metallic foil pan, preferably made of aluminum, and stamped from a thin sheet with a thickness on the order of 6.5 mils. The pan has a generally planar base wall 12 and a surrounding side wall extending generally upwardly from a periphery of the base wall 12. The side wall includes two side wall portions 14, 16 spaced apart along a longitudinal direction, and front and rear wall portions 18, 20 spaced apart along a transverse direction generally perpendicular to the longitudinal direction. The pan also has a rim wall extending generally outwardly from a periphery of the side wall. The rim wall includes two rim wall portions 22, 24 integral with the front and rear wall portions 18, 20, and two more rim wall portions 26, 28 integral with the side wall portions 16, 14. The rim wall extends completely around a peripheral course around the side wall.

Figure 2:
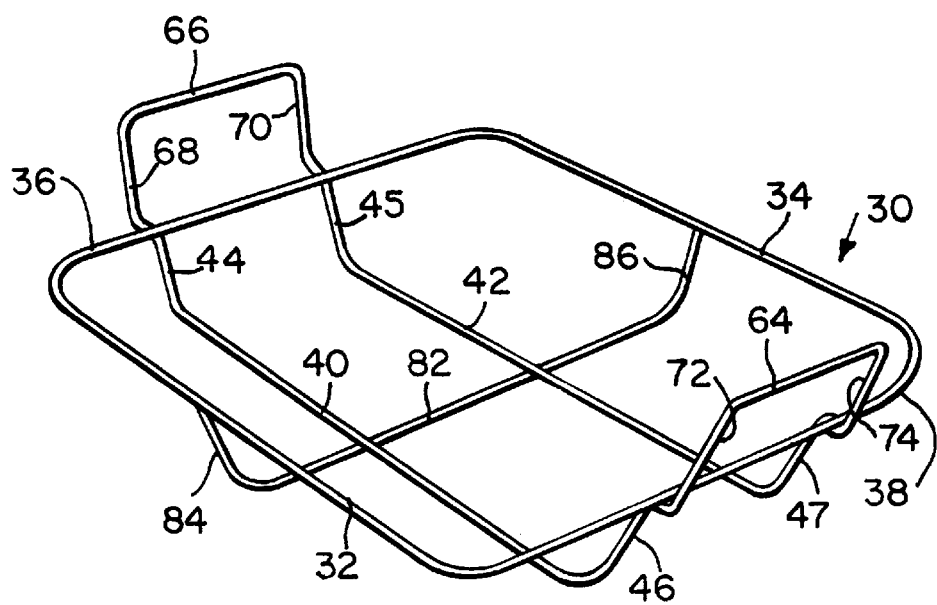
FIG. 2 is a perspective view of a framework for use with the pan of FIG. 1.

As described so far, the pan is a conventional, disposable, aluminum foil roasting pan. In accordance with this invention, a channel network is formed in the pan, and a framework 30 is fixedly mounted in the channel network to integrate the framework with the pan. The framework 30 is shown in isolation in FIG. 2 for ease of discussion. It will be expressly understood that the framework 30, as shown in FIG. 1, is an integral part of the reinforced pan and is not detachable or removable therefrom after assembly, as described below.

Figure 3:
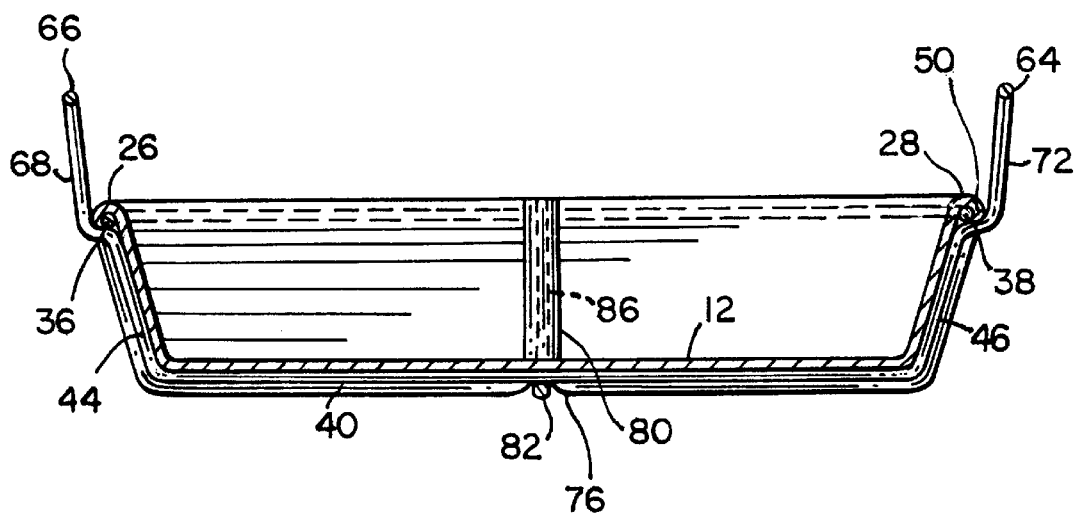
FIG. 3 is a sectional view taken on line 3—3 of FIG. 1.
Figure 4:
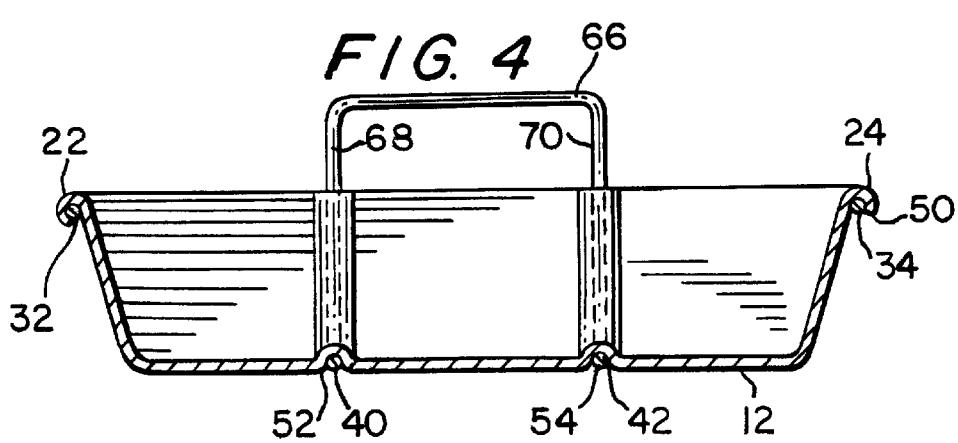
FIG. 4 is a sectional view taken on line 4—4 of FIG. 1.

The channel network includes a rim channel 50 bounded by the rim wall portions. As seen in FIGS. 3 and 4, rim wall portions 22, 24, 26, 28 bound an annular rim channel having an inverted U-shape in cross-section. The framework 30 includes an annular rim element having rim element portions 32, 34, 36, 38 fixedly mounted in the rim channel 50 underneath the rim wall portions 22, 24, 26, 28, respectively. The rim element reinforces the rim all along the periphery thereof.

The channel network includes a pair of base channels 52, 54 formed in the base wall 12, a pair of side channels 56, 58 formed in the side wall portion 14, and a pair of side channels 60, 62 formed in the side wall portion 16. Channels 60, 52 and 56 are in alignment, as are channels 62, 54, and 58. Each channel has an inverted U-shape in cross-section. The framework 30 includes a pair of base elements 40, 42 fixedly mounted in the base channels 52, 54, a pair of side elements 44, 45 fixedly mounted in the side channels 60, 62, and a pair of side elements 46, 47 fixedly mounted in the side channels 56, 58. The base elements 40, 42 reinforce the base 12. The side elements 44, 45 reinforce the side wall portion 16. The side elements 46, 47 reinforce the side wall portion 14.

A pair of handles 64, 66 extend generally upwardly above the rim elements 38, 36. Handle 64 includes two legs 68, 70 which are continuous extensions of side elements 44, 45. Handle 66 includes two legs 72, 74 which are continuous extensions of side elements 46, 47.

The channel network includes another base channel 76 formed in the base wall 12 and extending transversely of the base channels 52, 54, another side channel 78 formed in the side wall portion 18, and another side channel 80 formed in the side wall portion 20. Channels 76, 78 and 80 are in alignment. Each channel has an inverted U-shape in cross-section. The framework 30 includes another base element 82 fixedly mounted in the base channel 76, another side element 84 fixedly mounted in the side wall portion 18, and another side element 86 fixedly mounted in the side wall portion 20. The elements 82, 84 and 86 reinforce the base wall 12 and the side wall portions 18, 20 along the transverse direction.

The framework is preferably made of rigid, steel wire having a circular cross-section. The wire is advantageously coated with nickel. The various elements may be made using a forging process and/or a spot welding process. For example, the rim elements 32, 34, 36, 38 may be welded as a continuous piece, and then the free ends of elements 84, 86 are spot welded to the elements 32, 34 to form a first sub-assembly. All the other elements of the framework form a second sub-assembly. The second sub-assembly can be mounted in the corresponding channels of the pan, followed by the mounting of the first sub-assembly to the second subassembly, preferably using spot welding at the junctions where the sub-assemblies contact each other.

The elements that are received in the channels are held in place by a tight friction fit. The pan is actually deformed and stamped around the elements to ensure close contact. Although not necessary, a heat-resistant adhesive can be employed within the channel network to help anchor the framework in place. The framework reinforces the pan not only lengthwise of the pan between the handles, but also widthwise of the pan, as well as entirely underneath the rim around the periphery of the pan.

It will be understood that each of the elements described above, or two or more together, also may find a useful application in other types of constructions differing from the types described above.

While the invention has been illustrated and described as embodied in a reinforced cooking pan, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A reinforced pan for supporting a food to be cooked, comprising:
 a) a base wall constituted of a metallic foil and having a periphery,
 b) a side wall constituted of a metallic foil and extending in a generally upward direction from the periphery of the base wall,
 c) a rim wall constituted of a metallic foil and extending along a generally outward direction from the side wall, the rim wall also extending along a peripheral course around the side wall, the rim wall having rim wall portions extending along the peripheral course, d) a channel network having at least one channel bounded by wall portions of at least one of the walls, the channel network having a rim channel bounded by the rim wall portions, and e) a framework integrated in the channel network and having at least one reinforcing element fixedly mounted in and along said at least one channel to reinforce said at least one of the walls, the framework including a rim element mounted in the rim channel to reinforce the rim, and a pair of handles extending generally along the upward direction above the rim wall, the handles being connected to the rim element.

2. The reinforced pan of claim 1, wherein the base wall has base wall portions; wherein the side wall has side wall portions; wherein the channel network has a pair of base channels bounded by the base wall portions, and two pairs of side channels bounded by the side wall portions; wherein each of the base channels is aligned with, and extends between, a respective pair of the side channels; and wherein the framework includes a pair of pan elements, each of the pan elements being mounted in and along a respective one of the base channels and the respective aligned pair of the side channels.

3. The reinforced pan of claim 2, wherein the base wall extends along a longitudinal direction, and wherein the base channels extend in mutual parallelism along the longitudinal direction.

4. The reinforced pan of claim 3, wherein the base wall has additional base wall portions; wherein the side wall has additional side wall portions; wherein the channel network has an additional base channel bounded by the additional base wall portions, and a pair of additional side channels bounded by the additional side wall portions; wherein the additional base channel is aligned with, and extends between, the pair of additional side channels; and wherein the framework includes an additional pan element mounted in and along the additional base channel and the aligned pair of the additional side channels.

5. The reinforced pan of claim 4, wherein the additional base channel extends along a transverse direction generally perpendicular to the longitudinal direction.

6. The reinforced pan of claim 1, wherein the framework is constituted of a one-piece metallic structure.

7. The reinforced pan of claim 6, wherein the metallic structure is constituted of a steel wire.

8. The reinforced pan of claim 1, wherein the walls have exterior surfaces facing away from the food to be cooked, and wherein the channel network includes a plurality of the channels, each of the channels being open at the exterior surfaces of the walls.

9. The reinforced pan of claim 8, wherein each of the channels has a generally U-shaped configuration.

10. A reinforced pan for supporting a food to be cooked, comprising:

a) a base wall extending along a longitudinal direction, constituted of a metallic foil and having a periphery, the base wall having base wall portions and additional base wall portions, b) a side wall constituted of a metallic foil and extending in a generally upward direction from the periphery of the base wall, the side wall having side wall portions and additional side wall portions, c) a rim wall constituted of a metallic foil and extending along a generally outward direction from the side wall, the rim wall also extending along a peripheral course around the side wall, d) a channel network having at least one channel bounded by wall portions of at least one of the walls, the channel network having a pair of base channels extending in mutual parallelism along the longitudinal direction and bounded by the base wall portions, and two pairs of side channels bounded by the side wall portions, each of the base channels being aligned with, and extending between, a respective pair of the side channels, and the channel network having an additional base channel bounded by the additional base wall portions, and a pair of additional side channels bounded by the additional side wall portions, the additional base channel being aligned with, and extending between, the pair of additional side channels, and e) a framework integrated in the channel network and having at least one reinforcing element fixedly mounted in and along said at least one channel to reinforce said at least one of the walls, the framework including a pair of pan elements, each of the pan elements being mounted in and along a respective one of the base channels and the respective aligned pair of the side channels, and an additional pan element mounted in and along the additional base channel and the aligned pair of the additional side channels, the additional base channel extending along a transverse direction generally perpendicular to the longitudinal direction.

11. The reinforced pan of claim 10, wherein the rim wall has rim wall portions extending along the peripheral course, wherein the channel network has a rim channel bounded by the rim wall portions, and wherein the framework includes a rim element mounted in the rim channel to reinforce the rim.

12. The reinforced pan of claim 11, wherein the framework includes a pair of handles extending generally along the upward direction above the rim wall, the handles being connected to the rim element.

* * * * *